Dec. 26, 1961 P. N. ARMSTRONG 3,015,089

MINIMAL STORAGE SORTER

Filed Nov. 3, 1958 4 Sheets-Sheet 1

INVENTOR.
PHILIP N. ARMSTRONG,
BY
Robert H. Himes
ATTORNEY.

Dec. 26, 1961 P. N. ARMSTRONG 3,015,089

MINIMAL STORAGE SORTER

Filed Nov. 3, 1958 4 Sheets-Sheet 2

INVENTOR
PHILIP N. ARMSTRONG.

BY

Robert H. Himes

ATTORNEY

Dec. 26, 1961 P. N. ARMSTRONG 3,015,089

MINIMAL STORAGE SORTER

Filed Nov. 3, 1958 4 Sheets-Sheet 3

INVENTOR
PHILIP N. ARMSTRONG,
BY Robert W. Hines
ATTORNEY

INVENTOR.
PHILIP N. ARMSTRONG,
BY Robert H. Himes
ATTORNEY 3,015,089

MINIMAL STORAGE SORTER

Philip N. Armstrong, Santa Monica, Calif., assignor to Hughes Aircraft Company, Culver City, Calif., a Delaware corporation Filed Nov. 3, 1958, Ser. No. 771,482
7 Claims. (Cl. 340—172.5)

This invention relates to a system for handling a plurality of randomly arranged character data, and more particularly to a data handling apparatus for sorting character data that is randomly stored in a plurality of record blocks in a predetermined ordered sequence.

Sorting is a basic procedure in data processing to the extent that it facilitates reference to any single item in a large file of information, and makes possible the collation of one file of data with another. Sorting a large tape file of many groups, i.e., record blocks, of data, however, is an acute problem in providing an efficient apparatus for data processing. Sorting techniques, for example, which can be accommodated by an electronic computer system require extensive programming as well as a considerable amount of costly computer time. Alternatively, other sorting apparatus includes memory equipment sufficient to store of the order of two times the information being sorted. On the other hand, present day minimal sorting techniques generally employ "open loop" systems which make an inefficient use of excessive numbers of read-write heads. Further, in this latter type of minimal storage sorting system, pairs of read-write heads must be placed sufficiently close together to enable information to be written in the same portion of the memory from which information has just been read.

It is therefore an object of the present invention to provide an improved minimal storage sorting apparatus.

Another object of the present invention is to provide a minimal storage sorting apparatus which incorporates a lesser number of read-write heads for sorting a specified number of record blocks in a specified number of passes than are employed in present systems, which read-write heads may be spaced from each other.

Still another object of the present invention is to provide a minimal storage sorting apparatus which requires substantially no additional memory other than that required to store the numbers to be sorted and which does not require programming.

A further object of the invention is to provide a minimal storage sorting system which utilizes its read-write heads for substantially 100% of its operating time.

A still further object of the invention is to provide a minimal storage sorting system capable of detecting when a sorting procedure has been completed.

Another object of the present invention is to provide a minimal storage sorter particularly adapted to employ a magnetic drum or other equivalent inexpensive equipment as its principal means for storing character data.

In general, the apparatus of the present invention is adapted to perform certain rearrangements for collections of record blocks. A record block may, for example, constitute a collection of 80 characters of 6 bits each. The minimal storage sorter of the invention is designed to perform sorting of these collections of character data so that when the procedure is completed the record blocks will be in such an order that the numerical equivalent of the blocks will increase or decrease in only one direction. The number composed of the characters of each record block which is to provide the basis on which the sorting is to be effected is designated as the "control number" of the block. The apparatus may be designed to have a capacity to sort sequences of records of a magnitude that is limited only by the available memory. Further, the apparatus of the invention may be adapted to detect when the sorting procedure is complete and then automatically stop the procedure and provide storage for the arranged sequence of record blocks.

According to a broad concept of the present invention, the disclosed minimal storage sorting apparatus includes a plurality of delay devices which may constitute a plurality of memory elements with associated read-write apparatus. These memory elements are characterized in that at least one is adapted to provide storage for only one record block. This one record block plus the quantity of record blocks capable of being stored by the remaining memory elements equal the total number of control numbers which may be sorted in one operation. The memory elements may be arranged in any arbitrary order or sequence. That is, it is not necessary that the size of the memory elements progressively increase or decrease. The sequence of memory elements will, however, be arranged so that in proceeding in a predetermined direction along the sequence of elements, the input to each memory element will appear prior to the output thereof. It is apparent that the storage medium for one or all of the memory elements may be provided by one or more magnetic drums, continuous tape files, or tape files of "infinite" length. Alternatively, sonic delay lines or other similar type device may be used. Irrespective of the type of delay device employed, however, it is necessary that each device provide a delay substantially equal to a preselected integral number of record blocks.

In operation, the character data to be sorted is initially stored in the aforementioned memory elements. In general, the sorting operation commences with the reading of a control number from each memory element. The control numbers are then compared and sorted into, for example, an increasing sequence of numbers and written back into the memory elements in a manner which would preserve an original sequence commencing from a predetermined point had there initially been one. This latter function is effected by a device which performs a cyclic permutation on the character data being applied to the memory elements from the sorting circuit. In general, if the memory elements are considered in a series commencing with their respective inputs, control numbers from the lines are sorted and the lesser to the greater numbers applied, respectively, to the memory elements from second to last and then first for a number of times equal to the number of record blocks stored by the first memory element of the series. Next, the control numbers are sorted and the lesser to the greater control numbers applied, respectively, to the memory elements from third to last, then first and second for a number of times equal to the number of record blocks stored by the second memory element. This process is continued for each memory element of the series, the lesser control number being applied to each memory element of the series for a number of times equal to the number of record blocks capable of being stored by the immediately prior memory element of the series, the first memory element being regarded as following the last memory element of the series. Sorting the control numbers for a number of times equal to the total number of record blocks in all the memory elements of the series completes one cycle of permutation.

The sorting procedure is complete when the control number as read from one record block is always greater or less than the control number read from an adjoining record block of the sequence for a complete cycle of permutation except, of course, where the two control numbers represent the first and last of the sequence being sorted in which case the control numbers must be lesser or greater, respectively.

The above-mentioned and other features and objects of this invention and the manner of obtaining them will become more apparent by reference to the following description taken in conjunction with the accompanying drawings, wherein.

Figure 1:
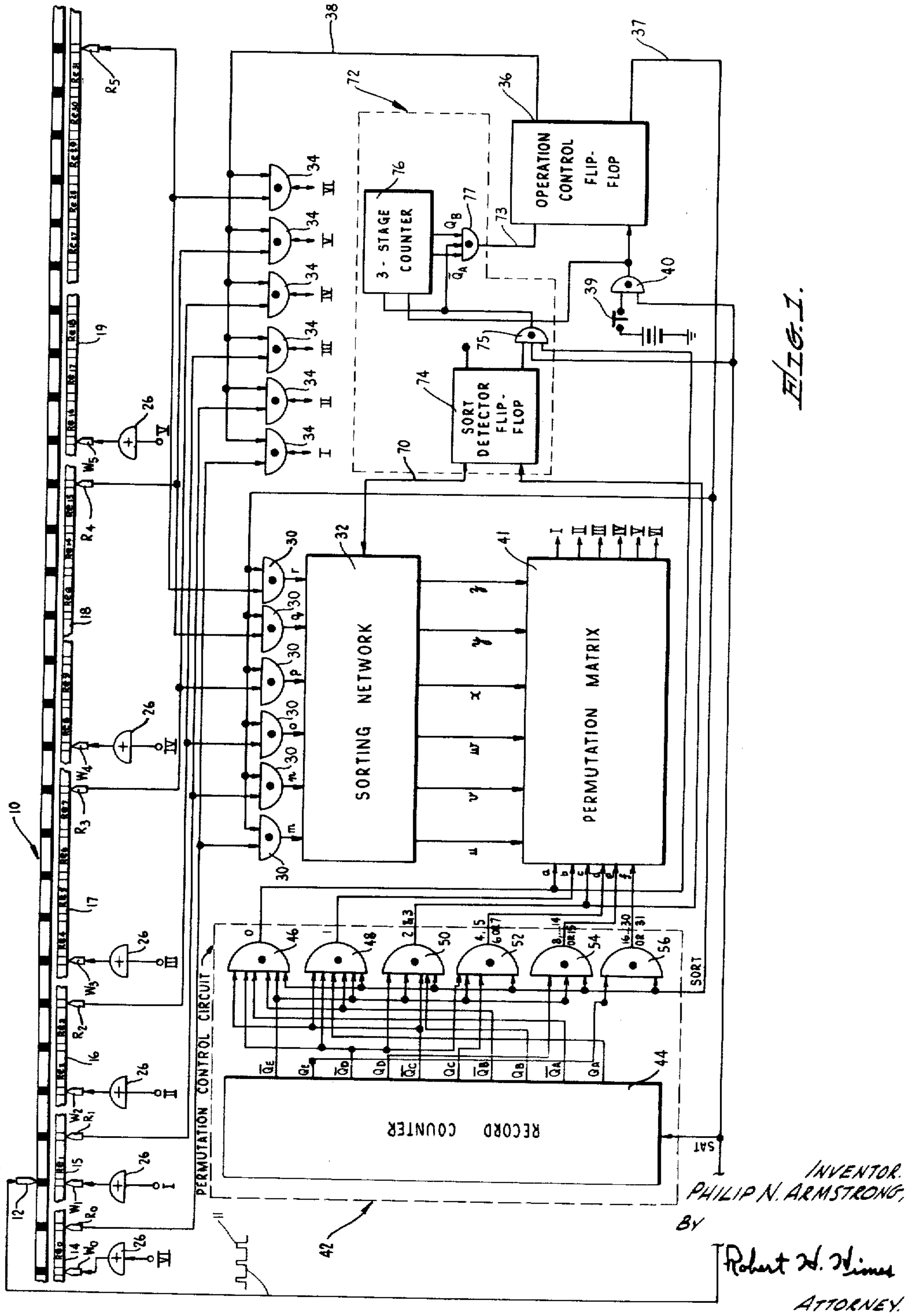
FIG. 1 is a schematic block diagram of the minimal storage sorting device of the present invention.

In describing the apparatus of the present invention, a convention is employed wherein individual "and" and "or" gates are shown as semicircular blocks with the inputs applied to the straight side and the output appearing on the semicircular side. An "and" gate is indicated by a dot (·) and an "or" gate by a plus (+) in the semicircular block. As is generally known, an "and" gate produces a "one" or information level output signal only when every input is at the information level, whereas an "or" gate produces an information level output signal when any one of the input signals thereto are at the information level.

Also, in addition to the above, a convention is employed in describing the particular embodiment of the present invention wherein the upper and lower inputs to the flip-flops, as they appear in the drawing, are designated as the "set" and "reset" inputs, respectively. An information level signal applied to either the set or reset inputs of a flip-flop will change its state in a manner such that an information level signal appears at the corresponding principal or complementary output terminals, respectively. Further, if information level signals are applied to both the set and reset inputs of a flip-flop, the state of the flip-flop will change in accordance with the last signal applied.

An illustrative and preferred embodiment of the device of the present invention relates to a data handling system which includes a plurality of memory elements and apparatus associated therewith for rearranging character data that is initially randomly stored in the memory elements in a predetermined ascending ordered sequence. Referring to FIG. 1, a track 10, which may constitute a magnetic tape file or a portion of a magnetic drum, provides a memory for record pulses 11 which are spaced so as to indicate the transitions between successive record blocks. A reading head 12 is disposed adjacent the track 10 in a manner to read the record pulses 11 as the track 10 is moved part the read head 12 at a uniform velocity.

In addition, the disclosed embodiment of the invention includes six additional memories constituting tracks 14, 15, 16, 17, 18 and 19. The tracks 14–19 together with the track 10 move at a constant uniform velocity from left to right, as viewed in the drawing. The inputs to the memories provided by tracks 14–19, inclusive, will in each case be at the respective left extremities thereof and the outputs at the respective right extremities thereof as viewed in the drawing. It is evident that the tracks 10 and 14–19 may be provided by a magnetic drum, not shown, or by portions of a magnetic tape file. In any event, as mentioned above, it is necessary that the velocities at which the tracks 10 and 14–19 are moved be synchronized with each other and, more preferably, be the same. This may be accomplished, for example, by disposing the track 10 along with the tracks 14–19 on a single magnetic drum or alternatively by disposing the track 10 side by side with the tracks 14–19 on a continuout magnetic tape. The tracks 14–19 are provided, respectively, with writing heads $W_0$, $W_1$, $W_2$, $W_3$, $W_4$ and $W_5$ which are disposed at the respective left extremities as viewed in the drawing. Each writing head is provided with an "or" gate 26 to enable information to be written on the tracks from a plurality of sources. The inputs to the "or" gate 26 leading to writing head $W_1$ is designated station I. Similarly, the inputs to "or" gates 26 leading to writing heads $W_2$, $W_3$, $W_4$, $W_5$ and $W_0$ are designated as stations II, III, IV, V and VI, respectively.

The delay provided by each of the tracks 14–19 is determined by the spacing between the respective writing heads $W_0$ to $W_5$ and its associated reading head. In the present case, a reading head $R_0$ is spaced one record block, $Re_0$, from its associated writing head $W_0$. Thus, the delay provided by track 14, together with read-write heads $R_0$ and $W_0$ amounts to one record block. Similarly, a reading head $R_1$ is also spaced one record block, $Re_1$, from its associated writing head $W_1$ at the right extremity of track 15, as viewed in the drawing, whereby track 15 provides an additional one record block delay. Reading head $R_2$, on the other hand, is spaced two record blocks, $Re_2$ and $Re_3$, from its associated writing head $W_2$ at the right extremity of track 16, thereby providing a delay of two record blocks. Further, reading heads $R_3$ and $R_4$ are spaced four and eight record blocks, respectively, from their associated writing heads $W_3$ and $W_4$ at the right extremities of tracks 17, 18, as viewed in the drawing, thereby to produce corresponding delays. Lastly, a reading head $R_5$ is spaced sixteen record blocks from its associated writing head $W_5$ at the right extremity of track 19, as viewed in the drawing, to produce a corresponding delay of sixteen record blocks. Thus, the tracks 14–19, together with their associated read-write heads, provide memory for 32 record blocks which, of course, limits the quantity of control numbers which may be stored to 32. As will hereinafter be explained, additional memory may be used to expand the capacity of the device to any desired amount. An embodiment of the apparatus of the present invention with memory provided for only 32 record blocks is described and explained for purposes of illustration and is not to be considered as a limitation on the capacity of the device to sort control numbers. Further, it is not essential that the individual memory elements, i.e., tracks 14–19, provide storage for any given number of record blocks or that the memory elements be arranged in any particular order as to size. In order to effect complete sorting, it is only necessary that one of the memory elements provide storage for only one record block.

The outputs from the reading heads $R_0$–$R_5$ are applied through "and" gates 30 to the input leads *m*, *n*, *o*, *p*, *q* and *r*, respectively, of a sorting network 32 and, in addition, through "and" gates 34 to stations I, II, III, IV, V and VI, respectively. In addition to the foregoing, an operation control flip-flop 36 has a lead 37 connected from its complementary output to an input to each of the "and" gates 30 and a lead 38 connected from its principal output to an input of each of the "and" gates 34. Prior to the sort operation and after the sort operation has been completed there exists an information level signal on the principal output lead 38 applied to the "and" gates 34 from the operation control flip-flop 36 and a zero level signal on the lead 37 applied to the "and" gates 30 whereby the information stored on the tracks 14–19 circulates from one track to the next, during which time information may be written on the tracks 14–19 through any of the stations I to VI in a manner such that the most significant bits are written first. Also, while the information is circulating from one track to the next in such a manner, it is evident that information stored on all of the tracks 14–19 may be read out from any one of the reading heads $R_0$ to $R_5$.

The sorting operation is initiated by changing the state of the operation control flip-flop 36 so as to produce an information level signal on lead 37 which is connected to the inputs of the "and" gates 30 and remove the information level signal from lead 38 which is connected to the inputs of the "and" gates 34. This may be instrumented, for example, by applying an information level voltage through a "commence-sort" switch 39 along with record pulses 11 through an "and" gate 40, to the reset input of the operation control flip-flop 36. An information level voltage is gated with the record pulses 11 through the "and" gate 40 in this manner so as to commence the sort operation at the beginning of a record block. In that the control numbers may have any random arrangement at the beginning of the sort operation, it is not essential that the sort operation commence with any particular record block. The switching of the information level signal from the inputs of "and" gates 34 to the inputs of the "and" gates 30 effectively connects the outputs from the reading heads $R_0$–$R_5$ to the input leads *m, n, o, p, q* and *r*, respectively, of the sorting network 32. A detailed description of the sorting network 32 together with its operation will be hereinafter presented. In general, the sorting network 32 functions in a manner such that the lowest to the highest control numbers fed in on input leads *m, n, o, p, q* and *r* are latch-connected to output leads *u, v, w, x, y* and *z*, respectively, during each record block interval.

The permutation matrix 41 in response to control signals produced by a permutation control circuit 42, which signals appear on leads *a, b, c, d, e* and *f*, cyclically switches the control numbers appearing on leads *u* to *z* to various combinations of stations I to VI, which stations are connected through the "or" gates 26 to the writing heads $W_1$–$W_5$ and $W_0$, respectively. In general, the permutation control circuit 42 is adapted to control the switching in a manner such that the leads *u* to *z* are connected to the stations I to VI for a number of record block intervals equal to the one record block which separates writing head $W_0$ and reading head $R_0$ along track 14. This interval of time is designated "count 0" in the present description. Next the leads *u* to *z* are connected to stations II–VI and I, respectively, for an interval designated as "count 1" equal to the one record block interval separating writing head $W_1$ from the reading head $R_1$ along track 15. The leads *u* to *z* are then successively connected to stations III–VI, I and II; stations IV–VI, I, II and III; stations V, VI and I–IV; and stations VI and I–V for the number of record block intervals separating the read-write heads associated with tracks 16, 17, 18 and 19, respectively. In the instant case, these intervals are designated, respectively, as counts 2 and 3, counts 4, 5, 6 and 7, counts 8 . . . 14 and 15, and counts 16 . . . 30 and 31. In that it is desired that this switching be effected by the permutation control circuit 42, information level signals are generated on the leads *a, b, c, d, e* and *f* to correspond to the aforementioned periods; that is, an information level signal is produced on lead "*a*" during count 0, on lead "*b*" during the count 1 interval, on lead "*c*" during the counts 2 and 3 interval, on lead "*d*" during the counts 4 to 7 interval, on lead "*e*" during the counts 8 to 15 interval, and on lead "*f*" during the counts 16 to 31 interval. To accomplish this, the permutation control circuit 42 includes a record counter 44 that is responsive to the record count pulses 11 and which includes five flip-flops connected in cascade. A convention is employed wherein the principal and complementary outputs of the first flip-flop of the cascade are designated by $Q_A$ and $\overline{Q}_A$, respectively. Similarly, the principal and complementary outputs of the next four succeeding flip-flops are designated, respectively by $Q_B$, $\overline{Q}_B$; $Q_C$, $\overline{Q}_C$; $Q_D$, $\overline{Q}_D$; and $Q_E$ and $\overline{Q}_E$. Employing this convention, information level signals may be produced during the count 0 interval by means of an "and" gate 46 responsive to signals $\overline{Q}_A$, $\overline{Q}_B$, $\overline{Q}_C$, $\overline{Q}_D$ and $\overline{Q}_E$; during the count 1 interval by means of an "and" gate 48 responsive to signals $Q_A$, $\overline{Q}_B$, $\overline{Q}_C$, $\overline{Q}_D$ and $\overline{Q}_E$; during the counts 2 and 3 interval by means of an "and" gate 50 responsive to signals $Q_B$, $\overline{Q}_C$, $\overline{Q}_D$ and $\overline{Q}_E$; during the counts 4–7 interval by means of an "and" gate 52 responsive to the signals $Q_C$, $\overline{Q}_D$ and $\overline{Q}_E$; during the counts 8–15 interval by an "and" gate 54 responsive to the signals $Q_D$ and $\overline{Q}_E$; and, lastly, during the counts 16–31 interval by an "and" gate 56 responsive to only the signal $Q_E$. In that it is necessary to generate the aforementioned control signals only during the sort operation, the complementary output from the operation control flip-flop 36 produced on the lead 37 may be connected to an input to each of the "and" gates 46–56. Although a specific example of a permutation control circuit has been described and illustrated, it is apparent that any counter circuit may be adapted to produce a sequence of information level signals to operate in conjunction with any arbitrarily selected series of memory elements. In the event that the capacity of the counter has to be greater than the total number of record blocks capable of being stored by the memory elements, it becomes necessary to recycle the counter at a number equal to one less than the number of record blocks stored if the zero state is used.

Figure 2:
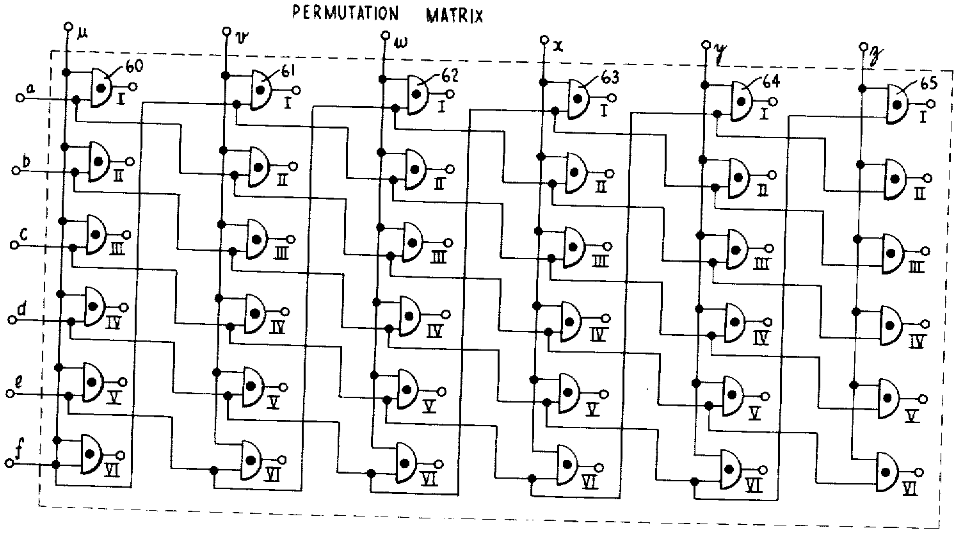
FIG. 2 is a schematic diagram of the permutation matrix employed in the apparatus of FIG. 1.

The permutation matrix 41 is adapted to operate in conjunction with six memory elements, namely, the tracks 14–19. Referring to FIG. 2, there is illustrated a schematic diagram of a preferred embodiment of the matrix 41 wherein the inputs *u* to *z* (see also FIG. 1) are each applied to the inputs of six sets of "and" gates 60–65, respectively. In addition, the lead "*a*" from the permutation control circuit 42 is applied to an input of one each of the "and" gates 60–65. Similarly, information level signals appearing on leads "*b–f*" are applied respectively, to inputs of one of each of the "and" gates 60–65. The outputs from the "and" gates 60–65 having an input connected to lead "*a*" and to leads *u . . . z* are connected, respectively, to stations I–VI. Thus, during the count 0 interval, an information level signal appears on lead "*a*" thereby connecting the leads "*u–z*" to stations I–VI, respectively. Similarly, the "and" gates 60–65 connected to the remaining leads "*b–f*" from the permutation control circuit 42 are gated so as to connect the leads *u, v, w, x, y, z*, respectively, to stations II–VI and I, III–VI, I and II, IV–VI, and I–III, V, VI and I–IV, and VI or I–V dependent upon which of the leads *a, b . . . f* the information level signal appears. From the above, it is evident that the information level signal appearing on leads *a, b, c, d, e* or *f* control the manner in which the lesser to the greater control numbers appearing on leads *u–z*, respectively, are connected to the stations I–VI, which stations are in turn connected through the "or" gates 26 to the writing heads $W_1$–$W_5$ and $W_0$. Furthermore, it is apparent that the principles employed in the above-described permutation matrix 41 may be easily adapted to provide a matrix that will operate with any desired number of memory devices.

The sorting operation is completed when the control numbers in two adjacent places of the sequence are consistently greater or less than each other for a complete cycle of permutation except, of course, when the first and last numbers of the sequence being sorted occupy the two places. To this extent, the sorting network 32 is adapted to provide an information level signal on a lead 70 when control numbers having two adjacent places in the sequence have been sorted or exchanged. A sorting completion detection circuit 72, in response to this information level signal appearing on lead 70 is then adapted to provide a trigger signal. At the end of the count zero interval when the sort operation has been completed, this trigger signal is applied over a lead 73 to the input of the operation control flip-flop 36 thereby switching the information level control signal from the "and" gates 30 to the "and" gates 34 thus stopping the sort operation.

In the apparatus of the present invention, the reading heads $R_0$ and $R_1$ read control numbers from adjacent record blocks of the sequence being sorted, namely, record blocks $Re_0$ and $Re_1$. The last and first control number in the sequence appears in record blocks $Re_0$ and $Re_1$, respectively, during the count 1 interval. It is thus desirable to ascertain when there has been an exchange of control numbers of the remaining count intervals except during the count 1 interval when there obviously will always be an exchange after the sequence has been sorted. Since this is not a complete cycle of permutation, the sort completion detection circuit 72 is adapted to generate a trigger signal after two complete cycles of permuation have passed without an exchange except for the count 1 interval. To accomplish this, the sort completion detection circuit 72 includes a detector flip-flop 74 having its set input connected to lead 70 from the sorting network 32 and its reset input connected to lead "*c*" from the permutation control circuit 42. Thus, the detector flip-flop 74 is reset at the commencement of the count 2 interval thereby producing an information level signal on its complementary output. If there is an exchange during any subsequent count interval up to and including count 0 interval, an information level signal will appear on lead 70 to set the detector flip-flop 74, thereby removing the information level signal from its complementary output. An "and" gate 75 responsive to record count pulses 11 and having inputs connected to lead "*a*" from the permutation control circuit 42 and to the complementary output of flip-flop 74 has its output connected to the set input of a three-stage counter 76 and in addiion to an input of an "and" gate 77. The three-stage counter 76 has its reset input connected to the output of "and" gate 40 whereby its principal outputs are all returned to zero at the commencement of the sort operation. Thus, if there have been no exchanges during a cycle of permutation from the commencement of count 2 to the end of count zero, an information level signal will continue to appear on the complementary output from flip-flop 74. Thus, when the record count pulse 11 at the end of the count 0 interval appears, all the inputs to "and" gate 75 will be at the information level thereby producing a trigger input to the three-stage counter 76 and to an input to the "and" gate 77. The "and" gate 77, in addition to being connected to the output of "and" gate 75, is connected to the $\overline{Q}_A$, $Q_B$ output leads from the three-stage counter 76; thus when the second trigger signal is received through gate 75, the counter 76 will produce information level signals on both the $\overline{Q}_A$, $Q_B$ output leads therefrom whereby the trigger signal from "and" gate 75 also passes through "and" gate 77 and is applied over the lead 73 to the operation control flip-flop 36 thereby to stop the sort operation at the end of a record block.

Figure 3:
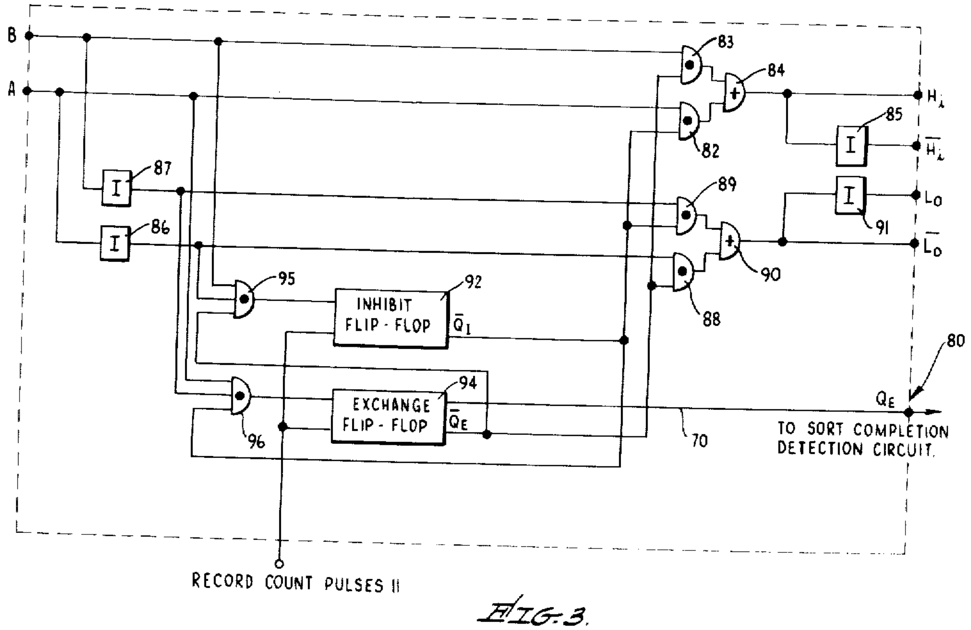
FIG. 3 is a wiring diagram of a two-way data compare-sort apparatus.

Prior to describing the sorting network 32, it is preferable to describe a two-way data compare-sort apparatus 80 shown in FIG. 3. As will be hereinafter described in connection with FIG. 4, the sorting network 32 is composed of a number of two-way data compare-sort apparatus 80 which may be of the type disclosed and claimed in a copending application for patent, "A Two-Way Data Compare-Sort Apparatus," by Philip N. Armstrong et al., Serial No. 777,551, now Patent 2,984,822, Nov. 4, 1960 and assigned to the same assignee as is the present case. Referring to FIG. 3, the two-way data compare-sort apparatus 80 receives first and second input signals at terminals A, B, respectively. As previously specified, the input signals constitute binary words arranged with the most significant bits first. The terminals A, B are connected through "and" gates 82, 83, respectively, to the inputs of an "or" gate 84, the output of which is connected to a "Hi" output terminal. A complementary Hi output, $\overline{Hi}$, may be provided by connecting the output of "or" gate 84 through an inverter 85 to the $\overline{Hi}$ output terminal. Next, the terminals A, B are connected through inverters 86, 87, respectively, to "and" gates 88, 89, the outputs of which are connected through an "or" gate 90 to a complementary Lo output terminal, $\overline{Lo}$. A Lo output is then provided by connecting the output of "or" gate 90 through an inverter 91 to a Lo output terminal.

In addition to the above, the two-way data compare-sort apparatus 80 includes an inhibit flip-flop 92 and an exchange flip-flop 94. Each of the inhibit and exchange flip-flops 92, 94 has its respective reset input coupled to the reading head 12 whereby the record count pulses 11 reset the flip-flops 92, 94 prior to the commencement of each record block. The set input to the inhibit flip-flop 92 is connected to the output of an "and" gate 95 which has inputs connected to terminal B, the output of the inverter 86 which is connected to terminal A, and another to the complementary output of exchange flip-flop 94. The set input of the exchange flip-flop 94, on the other hand, is connected to the output of an "and" gate 96 which has inputs connected to terminal A, the output of inverter 87 which is connected to terminal B, and another to the complementary output of inhibit flip-flop 92. Lastly, the complementary output of inhibit flip-flop 92 is also connected to the inputs of "and" gates 82 and 89, and the complementary output from the exchange flip-flop 94 is connected to the inputs of "and" gates 83, 88.

In operation, the record count pulses 11 are applied to the reset inputs of the inhibit and exchange flip-flops 92, 94, whereby the respective complementary output signals $\overline{Q}_I$, $\overline{Q}_E$ both constitute information level voltages. Thus, all the inputs to the "and" gates 82, 83, 88 and 89 from the inhibit and exchange flip-flops 92, 94 initially have an information level signal applied thereto. The signals applied to terminals A, B so long as they are identical, may, therefore, flow through "and" gates 82, 83 and the "or" gate 84 to the Hi output terminal. Similarly, the complements of the signals applied to terminals A, B appearing at the outputs of the inverters 86, 87, respectively, so long as they are identical, may both flow through the "and" gates 88, 89, and the "or" gate 90 to the complementary Lo output terminal, $\overline{Lo}$.

Consider now a particular bit interval wherein the signal applied to terminal B is at the information level and the signal applied to terminal A is at the zero level. In that the inverter 86 connected to terminal A will produce an information level signal in response to a zero level input, all of the three inputs to "and" gate 95, namely the signal applied to terminal B, the complement of the signal applied to terminal A, and the complementary output signal $\overline{Q}_E$ from exchange flip-flop 94, are at the information level, thereby setting the inhibit flip-flop 92. The setting of the inhibit flip-flop 92 removes the information level signal from "and" gates 82 and 89 as well as from "and" gate 96, thereby leaving only the terminal B connected through to the Hi output terminal and only the inverter 86 connected from terminal A through "and" gate 88 and "or" gate 90 to the $\overline{Lo}$ output terminal. In addition, the removal of the information level signal $\overline{Q}_I$ from "and" gate 96 prevents any change in the state of the exchange flip-flop 94 during the remainder of the record block interval. In the foregoing operation, it is noted that the Lo output signal is produced by means of inverter 91 from the $\overline{Lo}$ output signal. This is done in this manner because when the signal applied to terminal B is greater than that applied to terminal A, the $\overline{Lo}$ output will always be at the information level; whereas the Lo output signal will be at the zero level.

Alternative to the above situation, consider when the signal applied to terminal A is at the information level during a particular bit interval and the signal applied to terminal B during the same bit interval is at the zero level. Assuming that there have been no prior differences between the signals applied to terminals A and B, it is apparent that the complementary output signal $\overline{Q}_I$ from inhibit flip-flop 92, the complement of the signal at terminal B and the signal at terminal A, which signals are applied to the inputs of "and" gate 96, will all be at the information level thereby setting the exchange flip-flop 94. Setting of the exchange flip-flop 94 removes the $\overline{Q}_E$ signal from the input of "and" gate 95 thereby preventing any subsequent changes of state by the inhibit flip-flop 92 during the record block interval. In addition, the signal $\overline{Q}_E$ is removed from the "and" gates 83, 88 thereby leaving terminal A connected through the "and" gate 82 and "or" gate 84 to the Hi output terminal, the terminal B connected through inverter 87, "and" gate 89, "or" gate 90 and inverter 91 to the Lo output terminal. Lastly, when an exchange is effected between signals appearing on terminals A and B, the exchange flip-flop 94 is set, thereby producing an information level signal $Q_E$ at the principal output thereof.

Figure 4:
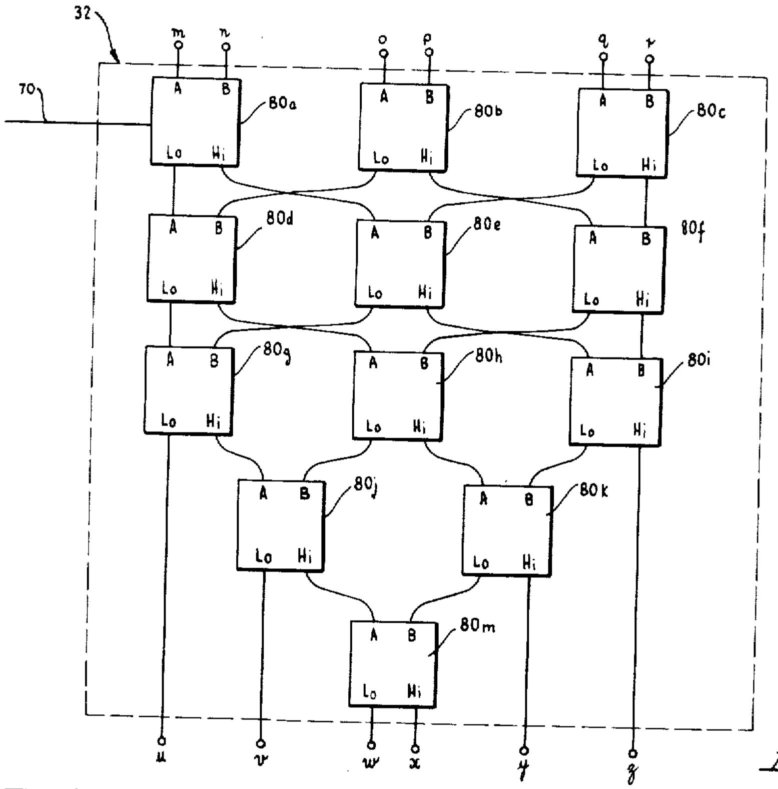
FIG. 4 is a wiring diagram of the six-way data compare-sort apparatus of a type which may be utilized in the embodiment of the present invention shown in FIG. 1.

Referring now to FIG. 4, there is shown an illustrative embodiment of a sorting network 32 which is composed of several two-way data compare-sort apparatus 80. In particular, sorting network 32 may comprise a first row of two-way data compare-sort apparatus 80*a*, 80*b* and 80*c* with the A, B input terminals thereof connected to input leads *m*, *n*; *o*, *p*; and *q*, *r*, respectively. The sort network additionally includes a second row of two-way data compare-sort apparatus 80*d*, 80*e* and 80*f*; a third row of two-way data compare-sort apparatus 80*g*, 80*h* and 80*i*; a fourth row of only two two-way data compare-sort apparatus 80*j* and 80*k*; and a single two-way data compare-sort apparatus 80*m* in a fifth row. The Lo output of apparatus 80*a* and the Hi output of apparatus 80*c* are connected respectively to the A input of apparatus 80*d* and the B input of apparatus 80*f*. The Hi and the Lo outputs of apparatus 80*b* are connected, respectively, to the A input of apparatus 80*f* and the B input of apparatus 80*d*. Next, the Lo output of apparatus 80*c* and the Hi output of apparatus 80*a* are connected to the B and A inputs, respectively, of apparatus 80*e*. Row 2, including apparatus 80*d*, *e* and *f*, is connected to row 3 which includes apparatus 80*g*, *h* and *i*, in the same manner as row 1 is connected to row 2. Next, the Hi output from apparatus 80*g*, together with the Lo output of apparatus 80*h*, are connected to the A and B inputs, respectively, of apparatus 80*j*. Similarly, the Hi output of apparatus 80*h* and the Lo output of apparatus 80*i* are connected respectively to the inputs A, B of apparatus 80*k*. Lastly, the Hi output of apparatus 80*j* and the Lo output of apparatus 80*k* are connected to the A, B, inputs, respectively, of apparatus 80*m*. The leads *u*, *v*, *w*, *x*, *y* and *z* are then connected respectively to the Lo output of apparatus 80*g*, the Lo output of apparatus 80*j*, the Lo output of apparatus 80*m*, the Hi output of 80*m*, the Hi output of 80*k* and the Hi output of 80*i*.

The lead 70 from the short completion detection circuit 72 is connected to the principal output of the exchange flip-flop 94*a* of the two-way data compare-sort apparatus 80*a*, thereby to apply the $Q_E$ signal from the apparatus 90*a* to the set input of the detector flip-flop 74. Also, each of the apparatus 80*a*–*m* are connected to the reading head 12 in the manner disclosed in connection with the description of two-way data compare-sort apparatus 80 in FIG. 3 so as to reset the respective inhibit and exchange flip-flops at the termination of each record block. The sorting network 32, as previously mentioned, operates in a manner such that a written sequence of numbers applied from reading heads $R_0$–$R_5$ to inputs *m*–*r*, respectively, appear without significant delay at terminals *u*–*z* in an ascending ordered sequence.

The overall manner of operation of the minimal storage sorting apparatus of the present invention may best be explained by reference to the timing chart illustrated in FIG. 5 wherein the numbers of record blocks stored by the memory elements, represented by the rectangles, is chosen to be the same as for the tracks 14, 15, 16 and 17 of the apparatus described in connection with FIG. 1. Memory elements to represent tracks 18 and 19 have been omitted so as to not unduly complicate and lengthen the example. Also, control numbers of the sequence to be sorted are shown as Arabic numerals for simplicity of comparison whereas in the actual apparatus the numbers would, of course, be stored in their binary form with the most significant bit intervals first.

Figure 5:
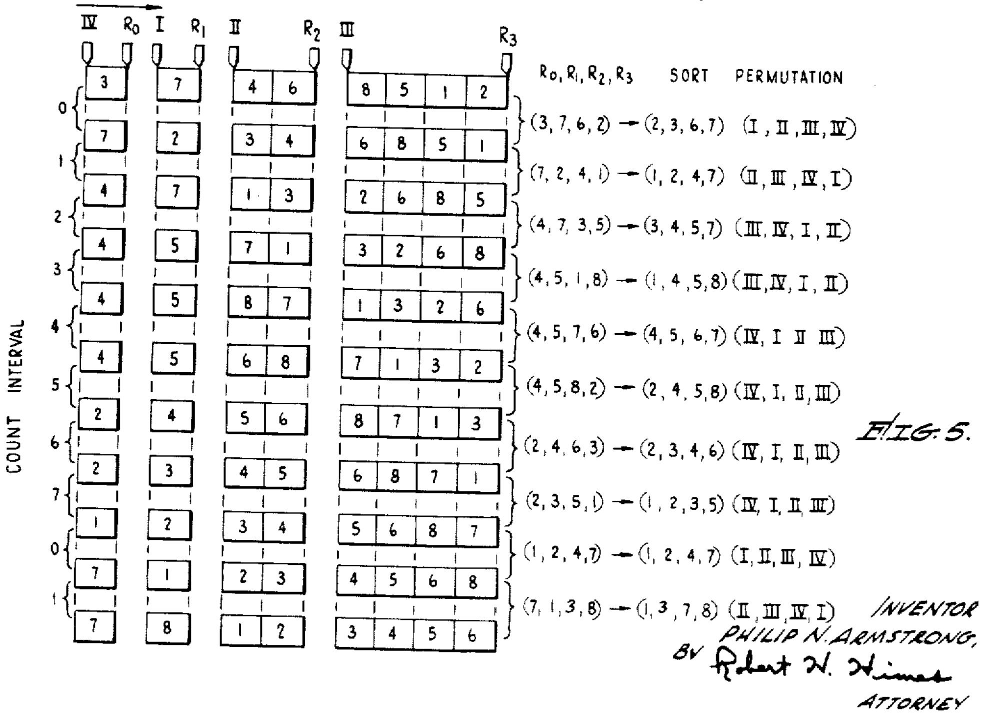
FIG. 5 is a timing chart of signals applicable to a minimal storage sorter of the type illustrated in FIG. 1.

Referring now to FIG. 5, an arbitary sequence 3, 7, 4, 6, 8, 5, 1 and 2 is assumed with the 3 being stored in a first memory element, the 7 in a second memory, the 4 and 6 in a third memory element, and the 8, 5, 1 and 2 in a fourth memory element, all of which move from left to right, as viewed in the drawing. Thus, at the commencement of each count interval, the reading heads $R_0$, $R_1$, $R_2$ and $R_3$ will commence reading the last number on the right of each of the first, second, third and fourth memory elements, respectively. These numbers are indicated in parentheses in the column headed ($R_0$, $R_1$, $R_2$, $R_3$), the number in each parenthesis being that which is read by the corresponding reading head. These numbers are then sorted to appear in an ascending ordered sequence, which sequence is in the parenthesis in the column headed "Sort." Lastly, under the column head, "Permutation" there is indicated the respective stations to which the numbers of the ascending ordered sequence are connected to be written back in the memory elements. This permutation follows the general rule previously specified. As in the case of the apparatus of FIG. 1, the writing stations are indicated by Roman numerals commencing from the second memory element to the last and then the first, as shown in FIG. 5. In that the memory elements are moving from left to right, as viewed in the drawing, the numbers are written at the respective left extremities thereof. The count intervals are indicated by brackets at the left of the successive rows of rectangles which show the numbers stored by the respective memory elements at the beginning and end of each count interval. Thus, since the first memory element stores but one record block, the permutation for one record block during the count 0 interval is such that the sorted numbers commencing from the smallest to the largest are connected, respectively, to stations I, II, III and IV. Similarly, since the second memory element stores but one record block, the permutation for an additional one record block during the count 1 interval is such that the sorted numbers are connected, respectively, to stations II, III, IV and I.

In that the third memory element, however, is capable of storing two record blocks, the permutation for an additional two record blocks during the counts two and three intervals is such that the sorted numbers are connected, respectively, to stations III, IV, I and II. Lastly, the fourth memory element is capable of storing four record blocks. Consequently, the permutation for the next four record blocks during the counts 4–7 intervals is such that the sorted numbers are connected, respectively, to stations IV, I, II and III. This completes a complete cycle of permutation.

Referring to FIG. 5, it is evident from inspection that the arbitrary sequence to be sorted is completely sorted at the finish of the second count 1 interval. Continued operation of the apparatus will retain this sequence.

Figure 6:
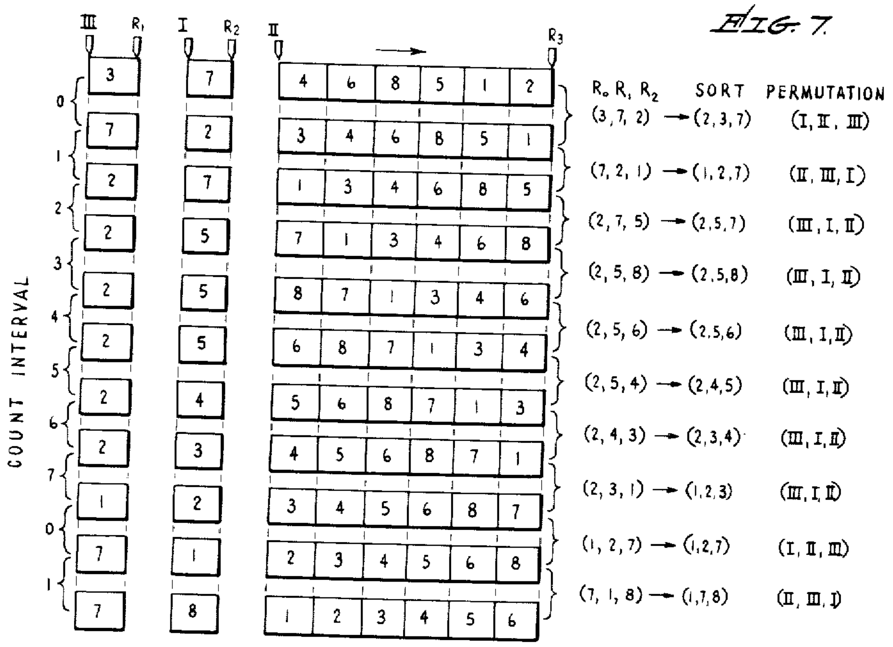

As mentioned above, it is not necessary that the storage sorting apparatus of the invention contain memory elements which conform to any particular arithmetic progression. Referring to FIG. 6, there is shown an apparatus with first, second and third memory elements capable of storing respectively one, one and six record blocks. The time chart is labeled in the same manner as was described for the time chart of FIG. 5. Also, the same arbitrary sequence of numbers as was sorted in FIG. 5 is illustrated as being sorted in FIG. 6 with the different arrangement of memory elements. As before, it is evident from inspection that the sequence is completely sorted at the finish of the second count 1 interval.

Figure 7:
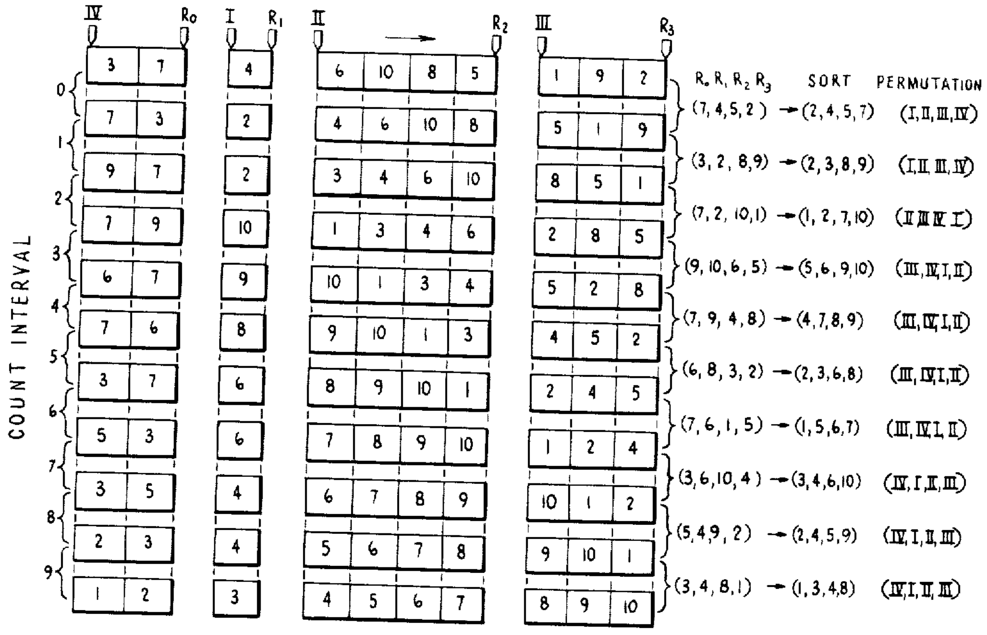
FIGS. 6 and 7 are time charts of signals applicable to alternative arrangements of the minimal storage sorter illustrated in FIG. 1.

Lastly, to illustrate that there are no restrictions as to the size and sequence of memory elements, except that one memory element store only one record block, there is illustrated in FIG. 7 an arrangement where first, second, third and fourth memory elements are capable of storing two, one, four and three record blocks, respectively. As before, the method and manner of labeling the time chart is the same as for the time chart of FIG. 5. Inspection of FIG. 7 shows that an arbitrary sequence of ten numbers, namely, 3, 7, 4, 6, 10, 8, 5, 1, 9, 2, are completely sorted at the finish of the count 8 interval.

The foregoing illustrations have been presented for the purpose of illustrating the operation of the minimal storage sorting apparatus of the present invention. In an actual apparatus, however, the memory elements must be capable of storing a number of record blocks equal to the number of control numbers in the sequence to be sorted, which number may be of the order of 1,000 or more.

What is claimed is:

1. An apparatus for handling a plurality of character data having substantially equal lengths, said apparatus comprising a series of no less than two memory elements, the first of which is considered to follow the last, for providing storage for said plurality of equal length character data, one of said memory elements providing memory for one length of said character data and the remaining memory elements providing memory for integral numbers of said lengths of character data; circuit means including a character data input from each of said memory elements and a corresponding number of character data outputs for dispatching simultaneously entered character data from said inputs to said outputs so that such character data appear simultaneously from the first to the last of said outputs in a predetermined ordered sequence as defined by the relative magnitude of the character data; and means for simultaneously connecting the first to the last of said outputs, respectively, to successive inputs of each of said memory elements of said series, with the first of said outputs being connected cyclically to each successive memory element of said series for an interval of time that is directly proportional to the extent of the memory provided by the preceding memory element of the series thereby to sort all of the character data in accordance with said predetermined ordered sequence.

2. The apparatus for handling a plurality of character data having substantially equal lengths as defined in claim 1 which additionally includes means in operative relationship with at least one of said series of no less than two memory elements for successively reading out binary signals representative of immediately adjacent character data, means responsive to said binary signals for producing an information level signal when one of said adjacent character data is consistently less than the remaining adjacent character data for at least one complete cycle of said connections to successive memory elements of said series except for when said adjacent character data represent the first and last character data of the sequence being sorted, and means responsive to said information level signal for stopping the sort procedure.

3. A data handling system comprising a series of 1, 2, . . . $n-1$, $n$, $n+1$, . . . $m$ memory elements, wherein $m$ is a positive whole number greater than one and $n$ may be any positive whole number equal to or less than $m$, for storing a plurality of equal length record blocks, each of which includes one control number, one of said memory elements providing storage for one of said equal length record blocks and the remaining memory elements providing storage for integral numbers of said equal length record blocks; circuit means including 1, 2, . . . $m$ character data inputs coupled, respectively, to outputs from said 1, 2, . . . $m$ memory elements and having a corresponding 1, 2, . . . $n-1$, $n$, $n+1$, . . . $m$ character data outputs for dispatching simultaneously entered character data from said inputs to said outputs so that the aforesaid character data appear simultaneously at said 1,2, . . . $n-1$, $n$, $n+1$, . . . $m$ outputs in a predetermined ordered sequence as defined by the relative magnitude of said control numbers; and means for successively connecting the said 1, 2, . . . $n-1$, $n$, $n+1$, . . . $m$ outputs of said circuit means, respectively, to inputs of the $n$, $n+1$, . . . $m$, 1, 2, . . . $n-1$ memory elements of said series, wherein $n$ is cyclically assigned successive values from 1 to $m$, inclusive, and each connection is made for an interval of time that is directly proportional to the number of record blocks capable of being stored by the $n-1$ memory element of said series at the time of said connection thereby to sort all of the character data of said record blocks in accordance with said predetermined ordered sequence.

4. The data handling system as defined in claim 3 which additionally includes means for producing a record count pulse at the termination of each set of record blocks simultaneously read-out from said 1, 2, . . . $m$ memory elements and wherein said means for successively connecting the said 1, 2, . . . $n-1$, $n$, $n+1$, . . . $m$ outputs of said circuit means, respectively, to the inputs of the $n$, $n+1$, . . . $m$, 1,2, . . ., $n-1$ memory elements of said series comprises a counting apparatus responsive to said record count pulses including a number of flip-flops each having a principal and a complementary output, the signals appearing at said principal and complementary outputs being capable of assuming a discrete combination of states for each record block to be sorted, and means responsive to said signals appearing at said principal and complementary outputs for producing a sequence of information level signals having durations that correspond to the number of record blocks capable of being stored by said respective memory elements.

5. The data handling system as defined in claim 3 wherein said means for successively connecting the said 1, 2, . . ., $n-1$, $n$, $n+1$, . . . $m$ outputs of said circuit means, to the inputs of the $n$, $n+1$, . . . $m$, 1, 2, . . . $n-1$ memory elements of said series includes $m$ "and" gates responsive to each of the $m$ outputs of said circuit means; means for applying each one of said sequence of information level signals to a discrete one of each of said $m$ "and" gates responsive to each of the $m$ outputs of said circuit means; and means for connecting the outputs from the "and" gates responsive to a single information level signal and to said 1, 2, . . . $m$ outputs of said circuit means, respectively, to the inputs of said series of memory elements commencing with the memory element succeeding that which corresponds to the respective information level signal.

6. A data handling system comprising a series of memory elements for storing a plurality of equal length record blocks, each of which includes at least one character data, the first and second of said memory elements each providing storage for one record block, the third memory element providing storage for two record blocks, the fourth memory element providing storage for four record blocks and the $m$ memory element providing storage for $2^{m-2}$ record blocks; circuit means including 1, 2, . . . $m$ character data inputs coupled, respectively, to the outputs from said 1, 2, . . . $m$ memory elements and having a corresponding 1,2, . . . $m$ character data outputs for dispatching simultaneously entered character data from said inputs to said outputs so that such character data appear simultaneously at said 1, 2, . . . $m$ outputs in an ascending ordered sequence as defined by the relative magnitude of said character data; and means for cyclically connecting said 1, 2, . . . $m$ outputs, respectively, to successive inputs of each of said memory elements of said series, said 1, 2, . . . $m$ outputs being first connected, respectively to said 2, 3, . . . $m$ and 1st memory elements during an interval of time corresponding to one record block, secondly to said 3, . . . $m$, 1 and 2nd memory elements for an interval of time corresponding to two record blocks, thirdly, said 1 to $m$ outputs being connected, respectively, to the inputs $n$, $n+1$, . . . $m$, 1, 2, . . . $n-1$ of said memory elements for intervals of time corresponding to $2^{n-2}$ record blocks wherein $n$, an integer, is successively increased from 4 to $m$, inclusive, and, lastly, said 1 to $m$ outputs being connected, respectively, to the inputs 1, 2, 3, . . . $n-1$, $n$, $n+1$, . . . $m$ for an interval of time corresponding to one record block thereby to sort all said character data in accordance with said ascending ordered sequence.

7. The data handling system as defined in claim 8 which additionally includes means for producing a record count pulse at the termination of each set of record blocks simultaneously read-out from said 1, 2, . . . $m$ memory elements and wherein said means for cyclically connecting the said 1, 2, . . . $m$ outputs of said circuit means, respectively, to the inputs of the memory elements of said series comprises a counter responsive to said record count pulses and including first, second, . . . $m-1$ flip-flops connected in cascade, each flip-flop having a principal and complementary output, a first "and" gate connected to the complementary outputs from each of said first, second, . . . $m-1$ flip-flops of said counter for producing an information level signal corresponding to said first memory element, a second "and" gate responsive to the principal output of said first flip-flop and to the complementary output from said second to said $m-1$ flip-flops for producing an information level signal corresponding to said second memory element, a third "and" gate responsive to the principal output of said second flip-flop and to the complementary outputs of said third to said $m-1$ flip-flop and a $q$ "and" gate responsive to the principal output of the $q-1$ flip-flop and to the complementary outputs of the $q$ to the $m-1$ flip-flops corresponding to the $q$ memory element wherein $q$ is an integer which is successively increased from 4 to $m-1$, inclusive and a $m$ "and" gate responsive to the complementary output of said $m-1$ flip-flop for producing an information level signal corresponding to said $m$ memory element.

References Cited in the file of this patent

UNITED STATES PATENTS

| | | |
|---|---|---|
| 2,674,733 | Robbins | Apr. 6, 1954 |
| 2,940,065 | Formby | June 7, 1960 |